June 4, 1968     D. G. MAGIL ET AL     3,386,782

KINGPIN BEARING LUBRICATION SYSTEM

Filed July 30, 1965     2 Sheets-Sheet 1

DONALD G. MAGIL
ROBERT E. SPENCER
*INVENTOR*

BY John R. Faulkner
Clifford L. Sadler

*ATTORNEYS*

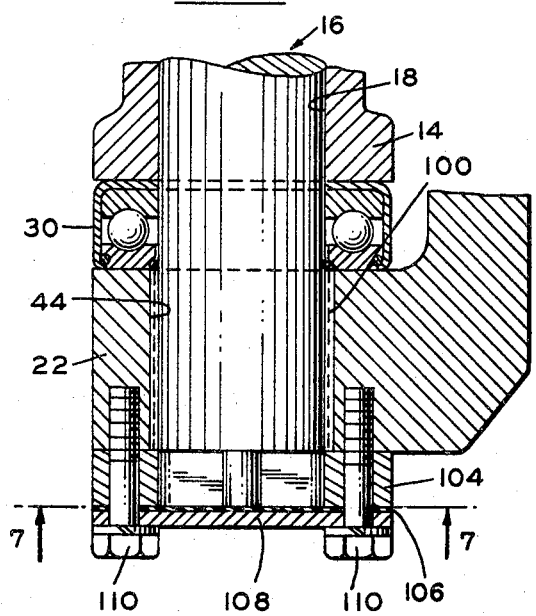
FIG. 5
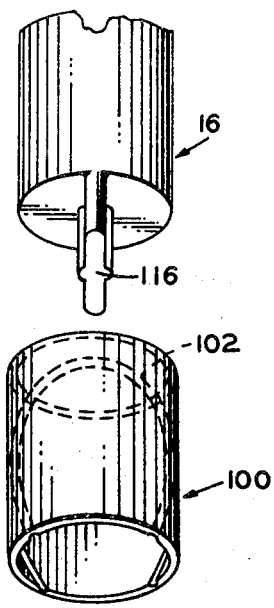
FIG. 6
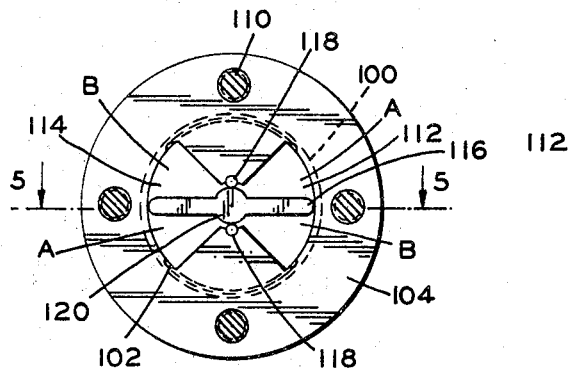
FIG. 7
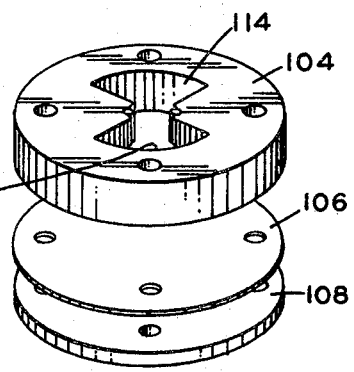
DONALD G. MAGIL
ROBERT E. SPENCER
INVENTOR
ATTORNEYS United States Patent Office 3,386,782
Patented June 4, 1968

3,386,782
KINGPIN BEARING LUBRICATION SYSTEM
Donald G. Magil, Dearborn Heights, and Robert E. Spencer, Taylor, Mich., assignors to Ford Motor Company, Dearborn, Mich., a corporation of Delaware
Filed July 30, 1965, Ser. No. 475,942
9 Claims. (Cl. 308—120)

The present invention relates generally to front suspension systems for motor vehicles, and more particularly to a lubrication system for the kingpin bushing between the steering knuckle and the kingpin of a front suspension.

In certain vehicles and particularly in trucks, the suspension for the front wheels comprises a transverse axle to which a steering knuckle is connected. The steering knuckle rotatably supports a front wheel and is pivotally connected to the outer end of the axle by a kingpin to permit the knuckle to turn about a steering axis. Bronze bushings are normally provided between the kingpin and the steering knuckle to facilitate the steering movement. A thrust bearing such as a ball bearing is interposed between the axle and the steering knuckle to support the sprung weight of the vehicle. The present invention is particularly directed to a novel means of lubricating the kingpin bushings.

Broadly, it is an object of the present invention to provide a positive system for lubrication of the kingpin bushings and to ensure long bearing life.

More specifically, it is an object of the present invention to provide a pumping device that is responsive to movement of the kingpin for circulating lubricating fluid along the bearing surface of a kingpin bushing.

In the preferred embodiment of the present invention, a kingpin bushing is situated at both ends of the kingpin and each bushing is provided with lubrication passages for circulating lubricant fluid along its bearing surface. A cavity is provided in the steering knuckle assembly at the upper and lower ends of the kingpin and each cavity is in communication with the lubrication passages of one of the bushings. A pump element is situated in each of the cavities and constructed so that when the steering knuckle turns during steering maneuvers, fluid is forced from the lubricant chambers through the passages.

The many objects and advantages of the present invention will become apparent from the following description and the accompanying drawings, in which.

Figure 2:
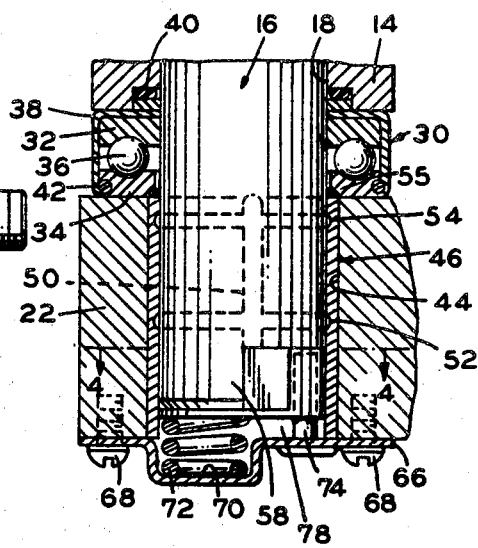
FIGURE 2 is an enlarged view of the bearing lubrication means disclosed in FIGURE 1.
Figure 4A:
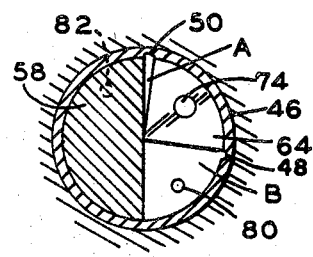

FIGURES 4A, B, and C are sectional views taken along section lines 4—4 of FIGURE 2 and illustrate the operation of the pumping mechanism of this invention;

FIGURE 5 is a front elevational view in section of a modification of the invention of FIGURES 1 to 4 and is taken along section lines 5—5 of FIGURE 7;

FIGURE 6 is a perspective exploded view showing the assembly of the several components of the construction of FIGURE 5; and FIGURE 7 is a sectional view taken along section lines 7—7 of FIGURE 5.

Figure 1:
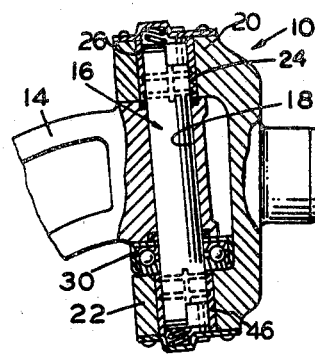
FIGURE 1 is a front elevational view of a portion of a front suspension for a vehicle including an axle, a kingpin, a steering knuckle, bearing means and lubricating means according to the present invention.

Referring now to the drawings for a more complete understanding of the present invention, FIGURE 1 illustrates a portion of the front suspension system for a motor vehicle which includes a steering knuckle 10 having a spindle portion 12 for rotatably supporting a road wheel (not shown). The steering knuckle 10 is pivotally connected to the outer end of an axle 14 by means of a kingpin 16.

The outer end of the axle 14 is provided with a bore 18 through which the kingpin 16 is inserted so as to have upper and lower ends extending therefrom. A locking pin (not shown) is used to secure the kingpin 16 to the axle 14. The steering knuckle 10 is provided with a yoke portion having upper and lower arms or branches 20 and 22 that pivotally engage the kingpin 16.

The upper branch 20 is provided with a bore 24 that is in coaxial alignment with the bore 18 of the axle 14. A bronze bushing 26 is positioned within the bore 24 and about the kingpin 16.

A ball bearing assembly 30 is disposed about the kingpin 16 and between the end of the axle 14 and the lower branch 22. Ball bearing 30 constitutes a thrust bearing supporting the sprung weight of the vehicle upon the steering knuckle 10. It permits the steering knuckle 10 to turn about a steering axis that is coaxial with the axis of the kingpin 16.

As seen in FIGURE 2, the bearing assembly 30 includes upper and lower bearing races 32 and 34 that are separated by a circumferential series of balls 36. The races are retained in engagement with the balls by a sheet metal retainer 38. A seal assembly 40 closes the gap between the end of the axle 14 and the sheet metal retainer 38 of the bearing 30. An O-ring 42 functions as a seal between the retainer 38 and the lower race 34 which is in tight flush contact with the adjacent surface of the lower arm 22 of the steering knuckle.

The lower arm 22 of the steering knuckle is provided with a bore 44 that is coaxially related to the axis of the kingpin 16 and which receives a bronze bushing 46. The bushing 46 is in sliding bearing contact with extending lower end of the kingpin 16.

A unique construction is provided at each of the bushings 26 and 46 for assuring proper and continuous lubrication. The bushings and related structure are substantially identical in construction and function, therefore, only the lubrication system of the lower bushing will be described in detail.

The bushing 46 has its internal bearing surface grooved so as to provide a pair of longitudinally extending passages 48 and 40. Axially spaced apart circumferentially extending grooves 52 and 54 are provided in the internal bearing surface of the bushing 46 in contact with the longitudinal grooves 48 and 50. The internal surface of the bushing 46 is in flush sliding contact with the external surface of the kingpin 16 so that the grooves 48, 50, 52 and 54 form lubricant passageways. A rubber O-ring 55 encircles the kingpin 16 and seals the upper end of the bushing 46.

The lower end of the kingpin 16 is machined along a diametral flat 56 so as to form a semicylindrical portion 58 which forms a pumping surface that extends beyond the remainder of the kingpin 16. A pumping element 60 is positioned within the lower end of the bearing or bushing 46. The pumping element 60 comprises a circular base portion 62 with a pie-shaped upstanding portion 64. The lower end of the bore 44 in the lower arm 22 is closed by a sheet metal member 66 that is held in place by a pair of machine screws 68. A depressed portion 70 is formed in the sheet metal member 66 into which a coil spring 72 is placed. The upper end of the coil spring 72 pushes against the disc portion 62 of the pumping element 60 and urges it into engagement with the end of the semicylindrical portion 58 of the kingpin 16. The upstanding pie-shaped portion 62 of the pumping element 60 is situated in the semicylindrical void located adjacent to the semicylindrical extension 58. A pin 74 is secured to the sheet metal member 66 and extends into a hole 76 formed in the pie-shaped portion 64. This connection provides a driving engagement between the pumping element 60 and the steering knuckle 10.

The various components are dimensioned to provide a chamber 78 that is situated beneath the disc portion 62 and above the retainer 66. This chamber contains lubricating fluid and communicates with either side of the pie-shaped portion 64 through holes 80 and 82.

Figure 4B:
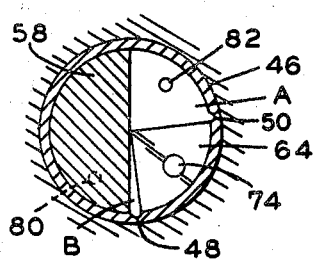
Figure 4C:
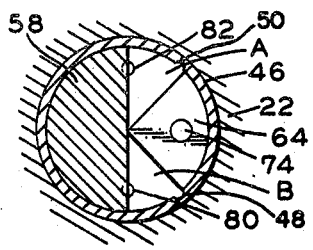
Figure 3:
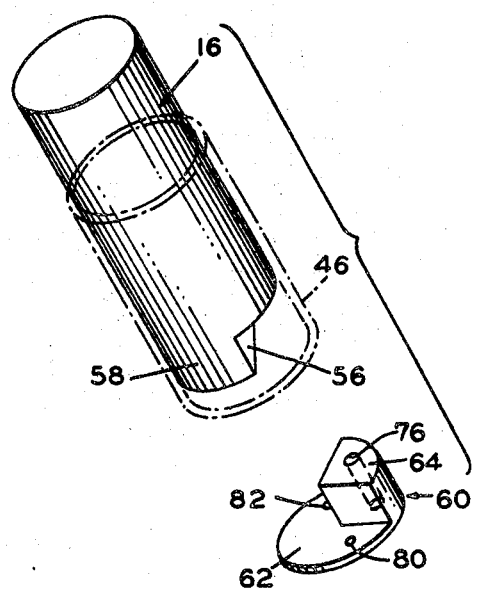
FIGURE 3 is a perspective view in exploded form disclosing the manner in which the elements are assembled.

For an understanding of the operation of the embodiment illustrated in FIGURES 1 and 2, reference is made to the relationship between the components as seen in the three views of FIGURE 4. Referring to FIGURE 4C, the various elements are shown as they would be situated when the vehicle's wheels are pointing in a straight-ahead position. It is noted that the upstanding pie-shaped portion 64 evenly divides the semicylindrical void adjacent to the semicylindrical extending portion 58 of the kingpin 16 into equally sized chambers A and B. Chamber A is in communication with the lubricant reservoir 78 through the opening 82 in the disc 62. Similarly, chamber B is in communication with the reservoir 78 through the port 80. When the steering knuckle 10 is turned in the position of a left-hand turn, the various components achieve the relationship illustrated in FIGURE 4A. As seen in this view, the communicating port 82 is sealed by the end of the semicylindrical portion 58. The chamber A has been greatly reduced in size forcing the lubricant contained therein to be expelled upwardly through the longitudinal passage 50 in the bushing 46. This flow of lubricant extends through the cylindrical passageways 52 and 54 until it comes into communication with the longitudinal passage 48. It is also to be noted that chamber B has greatly increased in size causing a vacuum that draws lubricant from the longitudinal passage 48. This assists the flow of lubricant from the passage 50 through the circumferential passages 52, 54 and out the other longitudinal passage 48.

When the vehicle makes a hard right-hand turn, the various components assume the relationship illustrated in FIGURE 4B. In this view, the lubricant flows on the reverse path of that associated with FIGURE 4A. It is noted that port 80 is closed off and that chamber B is greatly reduced in size. This causes a flow of fluid upwardly through the longitudinal passage 48 through the circumferential passages 52 and 54 and down the longitudinal passage 50 to the chamber A. Chamber A has greatly increased in size, therefore, it is capable of accommodating the increase in fluid.

As stated previously, a lubrication system is associated with the upper bushing 26 that is identical in construction and function to the arrangement described above and illustrated in FIGURES 2, 3 and 4. Thus, it is seen that during the operation of a vehicle incorporating this invention, steering movement of the road wheel will automatically pump lubricating fluid through surface passages of both kingpin bushings so as to effectively lubricate their bearing surfaces and to increase their life.

An alternate embodiment of the present invention is illustrated in FIGURES 5, 6 and 7. The operation of the construction illustrated in these views is generally similar to the operation of the invention illustrated in FIGURE 2, however, the construction does vary to a certain extent. In FIGURE 5, the axle 14 is supported on the lower branch 22 of the steering knuckle 10 by a ball bearing assembly 30. A cylindrical kingpin 16 is positioned in the bore 18 of the axle 14 and extends downwardly therefrom through the center of the ball bearing 30. The lower arm 22 of the steering knuckle is provided with a bore 44 that is in alignment with the axis of the kingpin 16. Positioned within the bore 44, is a kingpin bushing 100 which is provided with a series of lubricating grooves 102. A cylindrical element 104 is positioned against the lower end of the arm 22. A gasket 106 is located against the piece 104 and is held in place by a disc 108 which, in turn, is secured by bolts 110.

Piece 104 is centrally relieved to form a pumping chamber. The pumping chamber comprises two pie-shaped sections 112 and 114. Each of the sections or segments 114 and 112 are, in turn, divided by a vane 116 which forms a pumping surface. The vane 116 is formed on the lower end of the kingpin 16 and extends in a diametrical fashion from one sides to the other. A pair of resilient seals 118 are provided and connected to the piece 104. The seals 118 are in engagement with the cylindrical portion 120 which divides the diametral vane 116. The seals 118 serve to isolate the chambers 112 and 114, one from another.

As in the previous embodiment, the structure illustrated in FIGURE 5 is duplicated at the upper end of the kingpin. The device of FIGURES 5, 6 and 7 operates in generally the same fashion as the device of FIGURES 1 and 2. The vane 116 divides each of the chambers 112 and 114 into smaller variable volume chambers A and B. When the vehicle having the construction of FIGURE 7 is turned in a right-hand direction by causing the steering knuckle and hence, the piece 104 to rotate in a clockwise direction, the lubricant chambers A become reduced in size forcing lubricant fluid outwardly through the passageway 102 in the surface of the bushing 100. The fluid passes through the grooves 102 from the chambers A to the chambers B which have increased in size. Similarly, if the vehicle turns in the opposite direction counterclockwise rotation of the piece 104 will cause the lubricant chambers B to be reduced in size forcing fluid through passages 102 into the chamber A.

It is seen that with this construction every time the vehicle negotiates a turn or whenever a steering correction is made, fluid is pumped through the surface of the kingpin bushing 100. This reduces friction and greatly increases the life of the bearing surface.

The foregoing description presents the presently preferred embodiments of this invention. Modifications and alterations may occur to those skilled in the art which will come within the scope and spirit of the following claims.

We claim:
1. A vehicle axle construction comprising an axle, a steering knuckle, a kingpin interconnecting said axle and said knuckle and adapted to permit said knuckle to turn about a steering axis, said knuckle having a bore surrounding said kingpin, a cylindrical bushing positioned in said bore in bearing contact with said kingpin, said bushing having a groove formed on its internal bearing surface, a portion of said knuckle defining a chamber situated at the lower end of said kingpin, said chamber containing lubricant and being in communication with said groove, said kingpin having a pumping surface rigid therewith positioned in said chamber and constructed to expel lubricant into said groove from a portion of said chamber when said steering knuckle is turned about a steering axis.

2. A vehicle axle construction comprising an axle member, a steering knuckle member, a kingpin interconnecting said axle member and said knuckle member and adapted to permit said knuckle member to turn about a steering axis, said knuckle member having a bore surrounding said kingpin, a cylindrical bushing positioned in said bore in bearing contact with said kingpin, said bushing having a groove formed on its internal bear-surface, a lubricant filled chamber situated at the lower end of said kingpin, said chamber being in communication with said groove, said kingpin having a lubricant engaging pumping surface rigid therewith positioned in said chamber and constructed to expel lubricant into said groove from a portion of said chamber when said steering knuckle member is turned about a steering axis.

3. A vehicle axle construction comprising an axle, a steering knuckle, a kingpin pivotally interconnecting said axle and said knuckle and constructed to permit said knuckle to turn about a steering axis, said knuckle having a bore surrounding said kingpin, a cylindrical bushing positioned in said bore in bearing contact with said kingpin, said bushing having a groove formed on its internal bearing surface, said kingpin being contoured to define a portion for a lubricant filled chamber, said chamber being in communication with said groove, said steering knuckle having a pumping surface rigid therewith positioned in said chamber and constructed to expel lubricant into said groove from a portion of said chamber when said steering knuckle is turned about a steering axis.

4. A vehicle axle construction comprising an axle member, a steering knuckle member, pivot means interconnecting said axle member and said knuckle member and constructed to permit said knuckle member to turn about a steering axis, said pivot means comprising a kingpin rigidly connected to one of said members, a cylindrical bushing in bearing contact with said kingpin and connected to the other of said members, a lubrication passageway in communication with the bearing surface between said bushing and said kingpin, pumping means in communication with said passageway and constructed to lubricate said bearing surface comprising a lubricant engaging first pumping surface rigid with said axle member and a lubricant engaging second pumping surface rigid with said knuckle member, said pumping means being responsive to relative movement between said knuckle member and said axle member to force lubricant into said lubrication passageway when said steering knuckle is turned about a steering axis.

5. A vehicle axle construction comprising an axle, a steering knuckle, pivot means interconnecting said axle and said knuckle and constructed to permit said knuckle to turn about a steering axis, pumping means constructed to lubricate said pivot means comprising a first pumping surface nonrotatably fixed with respect to said axle and a second pumping surface nonrotatably fixed with respect to said knuckle, said pumping means being responsive to relative movement between said knuckle and said axle to force lubricant into a portion of said pivot means when said steering knuckle is turned about a steering axis.

6. A vehicle suspension and axle construction according to claim 2 and including a kingpin having a generally sector shape pumping surface.

7. A vehicle suspension and axle construction according to claim 2 and including a kingpin having a generally radial vane shaped pumping surface.

8. A vehicle axle construction according to claim 2 and including a lubricant reservoir communicating with said chamber.

9. A vehicle axle construction comprising an axle, a steering knuckle, pivot means interconnecting said axle and said knuckle and constructed to permit and knuckle to turn about a steering axis, pumping means constructed to lubricate said pivot means comprising a first pumping surface nonrotatably fixed with respect to said axle and a second pumping surface nonrotatably fixed with respect to said knuckle, said pumping surfaces defining portions of double chambers, one of said chambers expanding in volume and the other of said chambers decreasing in volume in response to relative movement between said knuckle and said axle to force lubricant through a portion of said pivot means when said steering knuckle is turned about a steering axis.

References Cited
UNITED STATES PATENTS

| | | | |
|---|---|---|---|
| 1,140,549 | 5/1915 | Watts | 308—120 |
| 1,456,619 | 5/1923 | Carlson | 308—120 |
| 1,547,006 | 7/1925 | Smith | 308—120 X |
| 1,967,614 | 7/1934 | Gits | 308—120 |
| 2,615,765 | 10/1952 | Venable | 308—120 |
| 2,625,448 | 1/1953 | Underwood | 308—78 |
| 2,629,639 | 2/1953 | Johansen | 308—78 |

MARTIN P. SCHWADRON, *Primary Examiner.*

G. N. BAUM, *Assistant Examiner.*